United States Patent
Jeon

(10) Patent No.: US 11,727,451 B2
(45) Date of Patent: Aug. 15, 2023

(54) IMPLEMENTING AND OPTIMIZING SAFETY INTERVENTIONS

(71) Applicant: Uber Technologies, Inc., San Francisco, CA (US)

(72) Inventor: Sangick Jeon, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/974,313

(22) Filed: Oct. 26, 2022

(65) Prior Publication Data
US 2023/0050206 A1    Feb. 16, 2023

Related U.S. Application Data

(63) Continuation of application No. 16/530,828, filed on Aug. 2, 2019, now Pat. No. 11,514,485, which is a
(Continued)

(51) Int. Cl.
*G06Q 30/0282* (2023.01)
*H04L 67/12* (2022.01)
(Continued)

(52) U.S. Cl.
CPC ......... *G06Q 30/0282* (2013.01); *G06N 20/00* (2019.01); *H04L 67/12* (2013.01);
(Continued)

(58) Field of Classification Search
CPC .... G06Q 30/0282; G06N 20/00; H04L 67/12; H04L 67/02; B60Q 9/00; H04Q 9/00;
(Continued)

(56) References Cited

U.S. PATENT DOCUMENTS 6,889,230 B1   5/2005  Rogers
6,970,831 B1  11/2005  Anderson et al.
(Continued)

OTHER PUBLICATIONS

Britt, R.R., "New In-Car Device Warns Speeding Drivers," Jun. 14, 2006, four pages, [Online] [Retrieved on Jan. 24, 2018] Retrieved from the Internet <URL: https://www.livescience.com/10543-car-device-warns-sDeedina-drivers.html>.
(Continued)

*Primary Examiner* — Kyaw Z Soe
(74) *Attorney, Agent, or Firm* — Fenwick & West LLP

(57) ABSTRACT

A network system provides interventions to providers to reduce the likelihood that its users will experience safety incidents. The providers provide service to the users such as transportation. Providers who are safe and have positive interpersonal behavior may be perceived by users as high quality providers. However, other providers may be more prone to cause safety incidents. A machine learning model is trained using features derived from service received by users of the network system. Randomized experiments and trained models predict the effectiveness of various interventions on a provider based on characteristics of the provider and the feedback received for the provider. As interventions are sent to providers, the change in feedback can indicate whether the intervention was effective. By providing messages proactively, the network system may prevent future safety incidents from occurring.

20 Claims, 6 Drawing Sheets

Related U.S. Application Data continuation of application No. 15/365,855, filed on Nov. 30, 2016, now Pat. No. 10,423,991.

(51) Int. Cl.
*G06N 20/00* (2019.01)
*H04L 67/02* (2022.01)
*B60Q 9/00* (2006.01)
*H04Q 9/00* (2006.01)

(52) U.S. Cl.
CPC ............. *B60Q 9/00* (2013.01); *H04L 67/02* (2013.01); *H04Q 9/00* (2013.01)

(58) Field of Classification Search
CPC .. H04Q 2209/40; G08G 1/005; G08G 1/0112; G08G 1/012; G08G 1/0129; G08G 1/0141; G08G 1/017; G08G 1/052; G08G 1/202; H04W 4/38; H04W 4/44
See application file for complete search history.

(56) References Cited

U.S. PATENT DOCUMENTS

| | | | |
|---|---|---|---|
| 7,552,063 | B1 | 6/2009 | McEachern |
| 8,731,770 | B2 | 5/2014 | Fischer |
| 9,477,639 | B2 | 10/2016 | Fischer et al. |
| 9,721,288 | B2 | 8/2017 | Abou Mahmoud et al. |
| 2004/0093257 | A1 | 5/2004 | Rogers et al. |
| 2004/0148178 | A1 | 7/2004 | Brain |
| 2004/0236596 | A1 | 11/2004 | Chowdhary et al. |
| 2005/0192931 | A1 | 9/2005 | Rogers |
| 2006/0112103 | A1 | 5/2006 | Besserman et al. |
| 2009/0222284 | A1 | 9/2009 | McEachern |
| 2010/0038416 | A1 | 2/2010 | Canora |
| 2010/0138282 | A1 | 6/2010 | Kannan et al. |
| 2010/0157061 | A1 | 6/2010 | Katsman et al. |
| 2010/0293030 | A1 | 11/2010 | Wu |
| 2010/0332287 | A1 | 12/2010 | Gates et al. |
| 2012/0102043 | A1 | 4/2012 | Verma |
| 2012/0233246 | A1 | 9/2012 | Guemez |
| 2014/0222512 | A1 | 8/2014 | Pace |
| 2014/0229238 | A1 | 8/2014 | Meyer et al. |
| 2014/0289016 | A1 | 9/2014 | Muto et al. |
| 2015/0011203 | A1 | 1/2015 | Schrader et al. |
| 2015/0025943 | A1 | 1/2015 | Schmidt et al. |
| 2015/0193806 | A1 | 7/2015 | Tarailo et al. |
| 2015/0204684 | A1 | 7/2015 | Rostamian et al. |
| 2015/0220942 | A1 | 8/2015 | Dubberley |
| 2015/0294422 | A1 | 10/2015 | Carver et al. |
| 2016/0012368 | A1* | 1/2016 | O'Connell ........ G06Q 10/06316 705/7.26 |
| 2016/0086391 | A1* | 3/2016 | Ricci ...................... G06Q 30/06 701/29.3 |
| 2017/0011562 | A1* | 1/2017 | Hodges ................... H04W 4/46 |
| 2017/0041737 | A1 | 2/2017 | Fischer |

OTHER PUBLICATIONS

Hauser, J. R. et al., "Customer Satisfaction Incentives," Marketing Science, vol. 13, No. 4, Nov. 1, 1994, DD. 327-350.

Rosenblat, A. et al., "Discriminating Tastes: Customer Ratings as Vehicles for Bias," Data & Society, Oct. 2016, pp. 1-21.

Wilson, T. B. et al., "Market Research Findings: Hourly Employee Engagement and Reward Systems," Oct. 2009, pp. 1-73.

United States Office Action, U.S. Appl. No. 15/365,855, dated Jun. 26, 2018, 67 pages.

United States Office Action, U.S. Appl. No. 15/365,855, dated Jan. 29, 2018, 33 pages.

United States Office Action, U.S. Appl. No. 15/365,855, dated Mar. 23, 2017, 37 pages.

\* cited by examiner

400

Create safe communities by obeying speed limits and traffic laws. Riders will appreciate your dedication to safety!
410

We are receiving reports that your driving is unsafe. We're committed to safety and if these reports continue, your account may be deactivated.
420

We have received multiple reports that your driving is unsafe. If these reports continue, your account will be deactivated.
430

Please remember to treat all riders with respect. Here are some tips on staying calm, cool, and professional.
450

We are receiving reports that your behavior is unsafe. We're committed to safety and if these reports continue, your account may be deactivated.
460

We have received multiple reports that your behavior is unsafe. If these reports continue, your account will be deactivated.
470

Receive feedback data from a first client device of a user during a service provided by a provider
510

Receive telematics data from one or more sensors
520

Determine a type of safety risk
530

Use the telematics data and the type of safety risk as inputs to a machine learning model to determine an intervention type
540

Provide an intervention for display on a second client device of the provider
550

FIG. 5

IMPLEMENTING AND OPTIMIZING SAFETY INTERVENTIONS

CROSS REFERENCE TO RELATED APPLICATIONS

This application is a continuation of co-pending U.S. application Ser. No. 16/530,828, filed Aug. 2, 2019, which is a continuation of U.S. application Ser. No. 15/365,855, filed Nov. 30, 2016, all of which are incorporated by reference in their entirety.

BACKGROUND

1. Field of Art

The present disclosure generally relates to the field of machine learning, and more specifically to providing safety interventions to providers of a network system.

2. Description of the Related Art

The quality of service providers of a network system influences the degree of affinity that users of the system feel for the system. If the users perceive that the providers are providing low quality service such as exhibiting unsafe behavior, users may stop using the travel coordination system's services. It would be desirable in such cases for the network system to be able to identify providers having a low quality and take action to improve the quality of these providers before any problems exacerbate. Unfortunately, it is difficult to formulate a set of ad hoc rules that accurately capture the various and subtle interactions of different factors that influence the users' perceptions of the quality of providers. Further, it is difficult to determine what measures should be used to help low quality providers improve their service.

SUMMARY

A travel coordination system (e.g., a network system that implements a network service, such as a travel coordination service) uses a machine learning model to reduce the likelihood that users of the travel coordination system will experience safety incidents. The users include providers and riders of trips coordinated by the trip coordination system, where the providers provide transport to the riders. Providers who are safe drivers and have positive interpersonal behavior may be perceived by riders as high quality providers. However, other providers may be more prone to cause safety incidents. To distinguish the relative safety of different providers, the travel coordination system can determine a safety risk classification of a provider based on feedback from past trips of the provider. Safety risk classifications may indicate different types of risks such as dangerous driving, poor attitude, physical altercations, and abusive language, etc. The safety risk classification can be escalated if the corresponding provider causes safety incidents or receives negative feedback. The travel coordination system provides interventions to providers to prevent future safety incidents from occurring. The interventions may include warnings for a provider with a poor or escalated safety risk classification. On the other hand, the interventions may include safety tips for providers with a safety risk classification corresponding to safe driving and professional behavior.

A machine learning model is trained using features derived from trips requested and/or taken by users of the travel coordination system. The features may be based on information such as rider input feedback from a trip or telematics data captured by a sensor during the trip. The sensor may be a motion, audio, or camera type sensor, and may be included in a client device such as a smartphone device of the rider and/or the provider. The model may determine a safety risk classification for a provider such as whether the provider is likely to drive dangerously or behave inappropriately with riders during trips. Possible interventions may be sent to users with different safety risk classifications (or not sent) to determine the effectiveness of different interventions. Using these experimental results, the model may also be trained to predict the effectiveness of various interventions on a provider (or a subgroup of providers) based on the safety risk classification of the provider, characteristics of the provider, the feedback received for the provider, and the telematics data. Thus, the model learns from the results of randomized experiments performed by the travel coordination system using interventions provided by the travel coordination system to providers, as riders may report on the quality of trips before and after the intervention. As various interventions are sent (or not sent) to providers in the testing, the model learns from the test results which interventions for which providers are more likely to help improve, or maintain, the quality of service provided by the providers, e.g., how safely the provider drives the vehicle. Thus, the experimental selection of interventions to send to providers may be used to inform which interventions to provide to which providers. Further, the model may use the telematics data to determine the veracity of the received rider feedback.

BRIEF DESCRIPTION OF DRAWINGS

FIG. 4A is a diagram of messages associated with unsafe driving according to one embodiment.

FIG. 4B is a diagram of messages associated with unsafe behavior according to one embodiment.

FIG. 5 is a flowchart illustrating a process for providing safety interventions using machine learning according to one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
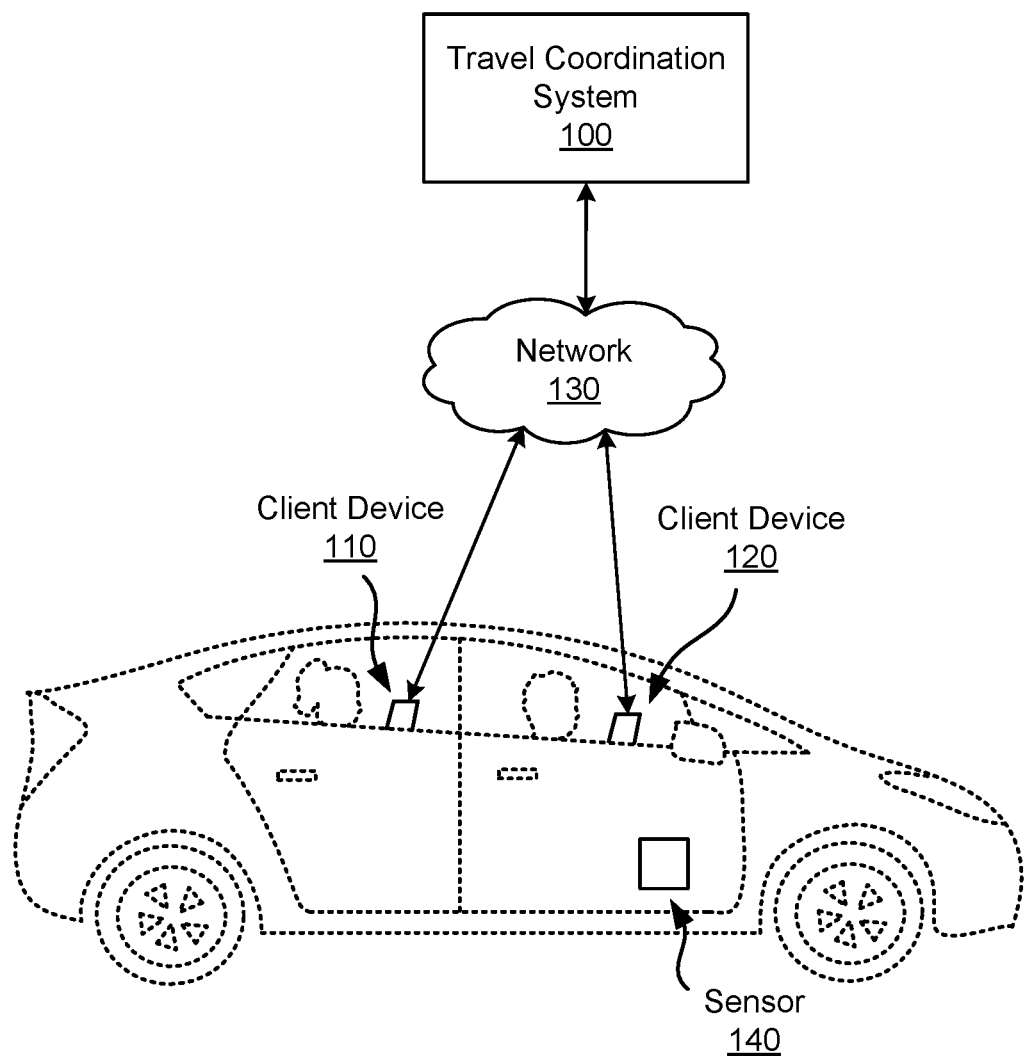
FIG. 1 is a diagram of a system environment for a travel coordination system according to one embodiment.

FIG. 1 is a diagram of a system environment for a travel coordination system 100 according to one embodiment. Users of the travel coordination system 100 may include providers and riders. In an example use case, a provider operates a vehicle to transport the rider from an origin location (e.g., pickup location) to a destination location. The system architecture includes the travel coordination system 100, a client device 110 of a rider, a client device 120 of a provider, and one or more sensors 140. The various systems shown in FIG. 1 are connected to each other via a network 130. In other embodiments, different and/or additional entities can be included in the system architecture. The functions performed by the various entities of FIG. 1 may vary in different embodiments. The travel coordination system 100 trains models to determine safety risk classifications and predict which types of interventions are likely to help improve the quality of service provided by providers, for example, how safely the providers drive the vehicle during trips with riders.

A rider can interact with the travel coordination system 100 through the client device 110 to request transportation or to receive requests to provide transportation. As described herein, a client device can be a personal or mobile computing device, such as a smartphone, a tablet, or a notebook computer. In some embodiments, the client device 110 executes a client application that uses an application programming interface (API) to communicate with the travel coordination system 100 through the network(s) 130.

Through operation of the client device 110, a rider can make a trip request to the travel coordination system 100. For example, a trip request may include user identification information, the number of passengers for the trip, a requested type of the provider (e.g., a vehicle type or service option identifier), the current location and/or the pickup location (e.g., a user-specific geographical location, or a current geographical location of the client device 110), and/or the destination for the trip. The current location of the client device 110 may be designated by the rider, or detected using a location sensor of the client device 110 such as a global positioning system (GPS) receiver. The rider may also input feedback via a user interface of the client device 110, e.g., the rider inputs text-based feedback or feedback represented as a rating using a touchscreen keyboard of the client device 110. Before, during, or after the trip, the client device 110 can provide the feedback to the travel coordination system 100.

A provider can use the client device 120 to interact with the travel coordination system 100 and receive invitations to provide transportation for riders. In some embodiments, the provider is a person operating a vehicle capable of transporting passengers. In some embodiments, the provider is an autonomous vehicle that receives routing instructions from the travel coordination system 100. For convenience, this disclosure generally uses a car as the vehicle, which is operated by a driver as an example provider. However, the embodiments described herein may be adapted for a provider operating alternative vehicles (e.g., boat, airplane, helicopter, etc.) or vehicles that do not necessarily need to be operated by a person.

A provider can receive invitations or assignment requests through the client device 120. An assignment request identifies a rider who submitted a trip request to the travel coordination system 100 and identifies the pickup location of the rider for a trip. For example, the travel coordination system 100 can receive a trip request from a client device 110 of a rider, select a provider from a pool of available (or "open") providers to provide the trip, and transmit an assignment request to the selected provider's client device 120. The travel coordination system 100 can also transmit other information to the client device 120 for display to the provider before, during, and after the trip. For example, the travel coordination system 100 provides an intervention message to the client device 120 during the trip in response to receiving feedback (from the rider via the client device 110) indicating that the provider is driving unsafely.

The client devices 110 and 120 may interact with the travel coordination system 100 through a client application configured to interact with the travel coordination system 100. The client application of the client device can present information received from the travel coordination system 100 on a user interface, such as a map of the geographic region, and the current location of the client device. The client application running on the client device can determine the current location and provide the current location to the travel coordination system 100.

The client devices 110 and 120 can communicate with the travel coordination system 100 via the network 130, which may comprise any combination of local area and wide area networks employing wired or wireless communication links. In one embodiment, the network 130 uses standard communications technologies and protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control/protocol/Internet protocol (TCP/IP), hypertext transport protocol (HTTP), simple mail transfer protocol (SMTP), and file transfer protocol (FTP). Data exchanged over the network 130 may be represented using any format, such as hypertext markup language (HTML) or extensible markup language (XML). In some embodiments, all or some of the communication links of the network 130 may be encrypted.

As described above, the travel coordination system 100 matches riders requesting transportation with providers that can transport the riders from their pick up location to their destination. The travel coordination system 100 can store maps of geographic regions in which the travel coordination system 100 services riders and providers, and may provide information about these maps to riders and providers through the client device 100. For example, the travel coordination system 100 may provide routing directions to the provider to pick up the rider and transport the rider to their destination.

The sensor 140 is an electronic device that captures telematics data during a trip provided by a provider to a rider of the travel coordination system 100. In some embodiments, the sensor 140 is a motion sensor such as an accelerometer, gyroscope, magnetic sensor, inertial measurement unit (IMU), and the like. The sensor 140 captures telematics data describing motion of a vehicle being operated by the provider during the trip with the rider. For instance, telematics data can describe the acceleration, speed, frequency and duration of braking, idle time, and orientation of the vehicle (e.g., whether the vehicle is turning, driving straight, or swerving). In some embodiments, the sensor 140 is an audio sensor that captures audio during the trip, for example, audio of the voices of the provider and/or the rider, or audio of any other sounds in vicinity of the vehicle during the trip such as sounds from a radio of the vehicle. In some embodiments, the sensor 140 is a camera that captures images and/or video of the environment inside or outside of the vehicle. For instance, the camera captures images of the provider and the rider inside the vehicle, or captures images of the road and other objects in front of the vehicle (e.g., a dashboard camera).

In some embodiments, one or more sensors 140 may be included in the client device 110 and/or 120. For example, a client device (e.g., a smartphone or tablet) includes a motion sensor, audio sensor, and/or a camera constituting sensors 140 and capturing telematics data during a trip. The client device provides the telematics data captured by the sensor(s) 140 to the travel coordination system 100 via the network 130. In embodiments where the client device is coupled to the vehicle (e.g., the client device is held in place by a mount physically coupled to the dashboard or windshield of a car), motion data captured by a motion sensor of the client device is representative of motion data of the vehicle as well. The client device 110 can provide the telematics data along with any feedback input by the rider to describe a trip. For example, the feedback indicates that the provider is driving over the speed limit and the telematics data indicates the speed of the vehicle during a portion of the trip.

Alternatively, the sensor 140 may be a standalone device that is located and/or coupled to the vehicle. For example, the sensor 140 is communicatively coupled to the on-board diagnostics (OBD-II) connector of the car. The sensor 140 receives telematics data via the OBD-II connector including mileage, fuel usage, engine status, vehicle transmission data, braking system data, warning signals (e.g., check engine light), geographical location, etc. The sensor 140 provides the telematics data to the travel coordination system 100 via the network 130, e.g., in real-time or at a time after a trip.

In some embodiments, the sensor 140 is not coupled to the vehicle. For example, the sensor 140 is a motion sensor, audio sensor, or camera that captures telematics data during at least a portion of a trip. The sensor 140 may be coupled to a traffic sign or traffic light that is in the vicinity of the vehicle (e.g., carrying the provider and the rider) as the vehicle crosses an intersection. The sensor 140 may also be coupled to other structures such as a building, tree, inside the ground, a person, or another vehicle.

II. Example System Architecture

Figure 2:
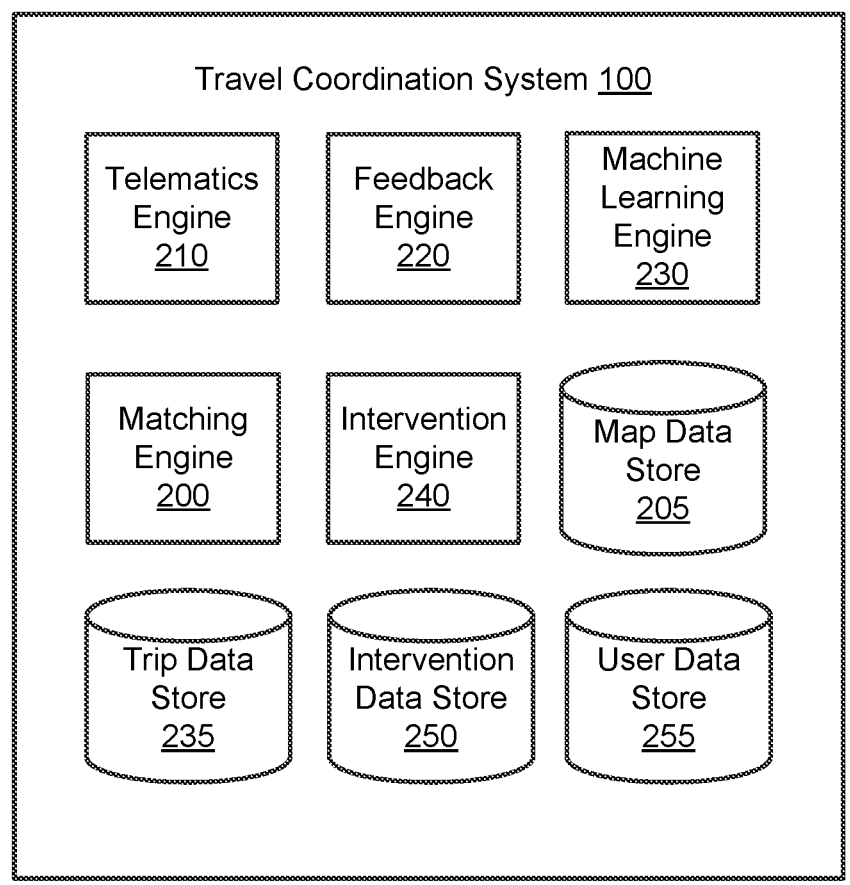
FIG. 2 is a block diagram illustrating the architecture of the travel coordination system according to one embodiment.

FIG. 2 is a block diagram illustrating the architecture of a travel coordination system 100 according to one embodiment. The travel coordination system 100 includes a matching engine 200, map data store 205, telematics engine 210, feedback engine 220, machine learning engine 230, trip data store 235, intervention engine 240, intervention data store 250, and user data store 255. In other embodiments, the travel coordination system 100 may include additional, fewer, or different components for various applications. Conventional components such as network interfaces, security functions, load balancers, failover servers, management and network operations consoles, and the like are not shown so as to not obscure the details of the system architecture.

In some embodiments, riders and/or providers use their client devices 110 to register with the travel coordination system 100, e.g., by creating accounts. The travel coordination system 100 can associate feedback received from a rider and telematics data from trips taken by the rider with the rider's registered account.

In some embodiments, the travel coordination system 100 determines (e.g., using a machine learning model) a safety risk classification to each provider. The safety risk classification may indicate a particular at-risk issue of a provider, for example, dangerous driving, unprofessional behavior, abusive language, etc. Further, the safety risk classification can indicate a level of risk of the issue, e.g., low, medium, or high. The safety risk classification may also indicate the likelihood that the provider will provide a future ride with low quality service, e.g., with a safety incident. In one example, the safety risk classification is based on past trips provided by the provider and/or user account information associated with the provider. For instance, if a given provider has received more than a threshold number of unsafe driving tickets, the travel coordination system 100 associates a "high" safety risk classification with the given provider. An unsafe driving ticket, for instance, is a ticket associated with previous feedback received from a rider, where the travel coordination system 100 determines that the previous feedback includes text indicative of a negative sentiment (e.g., aggressive driving or behavior of the given provider). As another example, an unsafe driving ticket is associated with previous feedback indicating a rating of the given provider that is below a threshold value, e.g., a 1-star rating (out of a 5-star scale) corresponding to safe driving during a trip. The safety risk classification may also be based on the number of unsafe driving tickets given the total number of trips that a provider has provided during a period of time. Thus, the travel coordination system 100 can normalize the safety risk classification to compare the performance of providers who provide a large number of rides with providers who provide a fewer number of rides. The travel coordination system 100 may change a provider's safety risk classification over time as the provider provides more rides. The travel coordination system 100 stores information about user accounts, user actions, and/or safety risk classifications in the user data store 255.

The matching engine 200 selects providers to service the trip requests of riders. The matching engine 200 receives a trip request from a rider and determines a set of candidate providers that are online, open (i.e., are available to transport a rider), and near the requested pickup location for the rider. The matching engine 200 selects a provider from the set of candidate providers to which it transmits an assignment request. The provider can be selected based on the provider's location, the rider's pickup location, the type of the provider, the amount of time the provider has been waiting for an assignment request and/or the destination of the trip, among other factors. In some embodiments, the matching engine 200 selects the provider who is closest to the pickup location or who will take the least amount of time to travel to the pickup location (e.g., having the shortest estimated travel time to the pickup location). The matching engine 200 sends an assignment request to the selected provider. If the provider accepts the assignment request, then the matching engine 200 assigns the provider to the rider. If the provider rejects the assignment request, then the matching engine 200 selects a new provider and sends an assignment request to the client device 120 for that provider.

The map data store 205 stores maps of geographic regions in which the travel coordination system 100 offers trip coordination services. The maps contain information about roads within the geographic regions. For the purposes of this disclosure, roads can include any route between two places that allows travel by foot, motor vehicle, bicycle, or other suitable form of travel. Examples of roads include streets, highways, freeways, trails, bridges, tunnels, toll roads, or crossings. Roads may be restricted to certain users, or may be available for public use.

The map data store 205 also stores properties of the map, which can include road properties that describe characteristics of the road segments, such as speed limits, road directionality (e.g., one-way or two-way), traffic history, traffic conditions, addresses on the road segment, length of the road segment, and type of the road segment (e.g., surface street, residential, highway, toll). The map properties also can include properties about intersections, such as turn restrictions, light timing information, throughput, and connecting road segments. In some embodiments, the map properties also include properties describing the geographic region as a whole or portions of the geographic region, such as weather within the geographic region, geopolitical boundaries (e.g., city limits, county borders, state borders, country borders), and topological properties.

The telematics engine 210 receives telematics data captured by one or more sensors 140 during a trip. The telematics engine 210 may receive the telematics data directly from a sensor(s) 140 or indirectly, for example, from the client device 110, the client device 120, or another system via the network 130. The telematics engine 210 stores the telematics data in the trip data store 235 and associates the telematics data with the trip. In some embodiments, the telematics engine 210 processes the telematics data to determine one or more parameters describing the trip. For example, the telematics engine 210 calculates a moving average and/or variance of the speed of the vehicle during one or more portions of the trip based on telematics data generated by an accelerometer. The portions may correspond to a first period of time during which the vehicle was driving on a freeway and a second period of time during which the vehicle was driving on local roads. As another example, the telematics engine 210 determines a level of swerving of the vehicle based on telematics data generated by a gyroscope. The telematics engine 210 may also use telematics data from a GPS sensor along with telematics data of an accelerometer or gyroscope to determine the vehicle's speed or level of swerving.

The feedback engine 220 receives feedback from the client device 110 of a rider during a trip (or within a predetermined period of time following the trip). The feedback is provided by the rider and may include text, a rating (e.g., on a scale from 1-5), an indication of strengths (e.g., safe driving or respectful attitude) or weaknesses (e.g., difficult to understand speech or unfamiliar with directions in city), an audio message, graphical content (e.g., a thumbs up or shining star graphic), and any other suitable form of feedback. The feedback may be associated with a type of feedback. Types of feedback may include vehicle operation, interpersonal behavior, language, knowledge of directions, passenger in car (e.g., where the passenger is not the provider or a rider), wrong provider, etc. As an example use case, the client device 110 displays keywords of different aspects of a trip and prompts the rider to select the keywords that were positive during the trip. The rider may selects the keywords "safe driving," which is associated with the "vehicle operation" type of feedback and the keywords "friendly conversation," which is associated with the "interpersonal behavior" type of feedback.

The feedback engine 220 can determine a feedback type of a feedback, e.g., if the feedback does not already have an associated type of feedback. In example use cases where the feedback includes text, the feedback engine 220 analyzes the text using natural language processing (NLP) techniques (e.g., lexical analysis, syntactic analysis, semantic analysis, information retrieval, sentiment analysis, stemming, fuzzy matching, anaphora resolution, etc.) to determine the type of the feedback. The feedback engine 220 can further categorize the types of feedback for additional granularity. For example, the vehicle operation type of feedback includes accident, phone handling, citation, or dangerous driving.

In some embodiments, an administrator (e.g., customer support representative) of the travel coordination system 100 categorizes the feedback including text received from users. The administrator reads the text and accordingly selects a type of the feedback. However, the user staff's selections may include errors and misclassifications. Thus, the feedback engine 220 may also analyze the feedback and edit the selected type of feedback of the administrator that differs from predicted feedback types or select the feedback for further review by a second administrator. The feedback engine 220 can also provide the feedback to a crowd-sourced system (e.g., outside of the travel coordination system 100) to determine the types of feedback or to audit previously selected types of feedback, e.g., selected by a user staff or by the feedback engine 220.

The feedback engine 220 stores the feedback and the type of feedback in the trip data store 235 and associates the feedback with the corresponding trip. The feedback may be associated with a trip that also has associated telematics data.

Initially, the travel coordination system 100 may lack information that allows it to distinguish between providers of different quality levels and the reasons for different quality levels. Characteristics (or features) of a provider of high quality include driving safely (e.g., not speeding, not maneuvering recklessly, or following traffic laws), acting with respectful and positive behavior toward riders during trips, and staying focused on driving without distractions (e.g., handling a phone, drink, or food). In contrast, characteristics of a provider of low quality include driving unsafely (e.g., driving over the speed limit, making dangerous maneuvers, or not stopping at stop signs), acting with a poor attitude (e.g., saying offensive comments, not being responsive to requests or questions from a rider, making unwanted physical contact with riders, or acting hostile), and becoming distracted while driving (e.g., by taking a phone call, eating, drinking, or otherwise interacting with a client device for purposes unrelated to the trip).

When a provider is identified as poor quality, the travel coordination system 100 may perform an intervention by communicating with the provider to address reasons for the poor quality or how to improve the provider's quality. Thus, the intervention engine 240, which is further described below, can provide a message to a provider as part of an intervention. The message may be a reactive message in response to the travel coordination system 100 determining that the provider provides low quality service. The message may also be a proactive message to prevent the provider from providing low quality service during future trips, or to provide positive reinforcement for providers who provide high quality or above average quality service to riders.

The machine learning engine 230 trains models that determine safety risk classifications of providers and predict the effectiveness of various interventions on a provider, based on characteristics of the provider and the feedback received for the provider (e.g., for the N most recent trips provided by the provider). Thus, the models may determine the quality of providers and help identify certain interventions that are likely to improve the quality of providers. The travel coordination system 100 may perform randomized controlled experiments (e.g., AB tests) using trips provided by providers to riders. Based on the safety risk classifications and/or effective interventions determined by the models, the travel coordination system 100 may determine which types of experiments to perform (e.g., involving certain types of feedback or interventions) and/or which providers or riders to include in population test samples for experiments.

As interventions are sent to providers (of trips for the controlled experiments), the change in feedback can indicate whether the intervention was effective and be used to train the model to predict, prospectively, whether a given provider would benefit from a specific intervention. If the provider is known to have low quality performance such as a high safety risk for dangerous driving, applying the intervention to the provider may help improve the quality of the provider's performance (e.g., reduce the number of traffic citations received). If the provider is known to have average or high quality performance such as consistently driving safely and following traffic laws, applying the intervention to the provider may help improve or maintain the quality of the provider's performance (e.g., continue to not have any traffic incidents). The machine learning engine 230 may use training algorithms such as gradient boosting, logistic regression, random forest, naïve Bayes, Bayesian networks, artificial neural networks, etc. The machine learning engine 230 may train the machine learning model many times to update the model as new data is received by the travel coordination system 100.

As the travel coordination system 100 receives information about trips provided by providers to riders, the machine learning engine 230 forms training sets of the trips. The machine learning engine 230 determines or derives features for each provider (or each trip) of the training sets based on the telematics data and feedback received from riders and stored in the trip data store 235, as well as interventions previously provided to providers.

To describe a provider for the model, the machine learning engine 230 may characterize the provider as a set of features, which may be an average or other combination of features from a set of trips for the provider. The set of features may include provider features, feedback features, and intervention features. The features may be related to vehicle operation, or in other words, how safely or proficiently the provider drives the car during trips with riders. For example, text feedback from a rider (e.g., "driver tailgated other cars and braked too much!") showing that the provider drives too aggressively indicates that the rider likely perceived the provider's service as low quality. The features may also include safety risk classifications of providers.

In some embodiments, the travel coordination system 100 determines interventions for providers based on the safety risk classifications and the measured efficacy of certain interventions (e.g., whether a particular warning message helped improve a provider's safe driving), without necessarily using further modeling or machine learning. For example, the travel coordination system 100 may categorize providers by their type of safety risk classification for a randomized AB experiment. By determining which intervention messages are correlated with improved quality of a certain category of providers, the travel coordination system 100 may design subsequent experiments accordingly. The travel coordination system 100 may provide the interventions with greater measured efficacy more frequently to providers in the certain category, e.g., for an experiment or during general operation of the travel coordination system 100.

The provider features may describe characteristics of the provider, such as demographics, geographical locations, and provider quality (e.g., as an average of previous feedback ratings). The machine learning engine 230 may generate provider features based on user account information from the user data store 255 and/or trip information from the trip data store 235. In one embodiment, the provider features categorize the provider based on the characteristics of the provider. For example, a provider feature associates the provider with a geographical region (e.g., California, New York, USA, or England) or a time range during the day during which the provider frequently provides trips (e.g., whether the provider typically drives in the mornings, afternoon, or late nights).

The feedback features may describe feedback received about a provider for a specific trip or for recent trips, such as from feedback by a client device 110. A trained model may analyze the feedback to determine a safety risk classification for one or more categories of feedback, such as driving quality, interaction or interpersonal behavior quality, and other characteristics of the trip. For example, the safety risk classification may include a Boolean value such as "safe" or "not safe." Alternatively, the safety risk classification may include a range of values such as "low," "medium," or "high", or be represented in any other form suitable for indicating a level of safety risk, e.g., a numerical score. In addition to an indication of a risk level or safety level, the safety risk classification may also be associated with a type of safety risk, e.g., vehicle operation, interpersonal behavior, or language behavior (e.g., a rider has difficulty understanding a provider because the provider does not fluently speak in a certain language).

As described below, the feedback may be supplemented by telematics data to update the safety risk classification depending on whether the textual feedback is supported by the telematics data (e.g., feedback that indicates bad driving results in a "not safe" safety risk classification of a "vehicle operation" type when the telematics data also indicates that the vehicle was speeding or swerving). The model may generate a safety risk classification for an individual trip, or for several prior trips of the provider (e.g., a running average for a score). The feedback scores may also only be updated for trips in which a rider provided feedback (e.g., the feedback scores include the last five trips in which a rider provided feedback). The feedback features indicate attributes of the trips that may be of relevance to how the riders perceive the quality of the providers of the trips and (by extension) whether the providers are likely to continue providing low quality service, e.g., by driving unsafely.

The intervention features describes prior interventions received by the provider, such as whether the provider received a given intervention within a recent time period. The intervention features may also indicate one or more intervention types that the travel coordination system 100 provided to the provider, or a total number of interventions received by the provider. Intervention features are further described below.

Because these various features may account for provider-specific characteristics, such as age and geographical information, individual variations in provider feedback scores, in addition to the prior interventions, models trained on these features may account for the different effects of these characteristics in the effectiveness of an intervention. For example, the trained model analyzes feedback received for a provider before and after the travel coordination system 100 provides a given intervention to the provider, as part of a randomized experiment. The feedback before the intervention indicates that the provider drives dangerously by speeding and swerving, while the feedback after the intervention indicates that the provider drives safely and stays under the speed limit. Thus, based on the results of the randomized experiment, the travel coordination system 100 determines that the given intervention likely contributed to the change in behavior of the provider, e.g., driving more safely. Further, the trained model may classify the provider as having a high risk (e.g., low quality) associated with dangerous driving. The classified likelihood of a provider's likely behavior is used with the results of the experiment to select messages for the provider. In some examples the messages are sent based on the provider's classification, and the messages identified as effective from the experiments are added to a set of possible messages to be used as interventions. As another option, the trained model, based on the test results, may also predict that providing the given intervention to other providers with similar characteristics as the provider (e.g., having a high risk classification for dangerous driving) has a high likelihood of resulting in the other providers improving their safety risk classification, or in other words, receiving more feedback indicative of safe driving. In one embodiment, the trained model ranks the given intervention more favorably than other types of interventions. The trained model may determine which intervention to provide to a particular provider based on the rankings of multiple types of interventions.

The machine learning engine 230 (or the trained model) can corroborate the veracity of the text feedback based on the telematics data for the same trip, e.g., motion data captured by an accelerometer of the provider's client device 120 indicates that the car experienced many incidences of higher than average acceleration and deceleration, which likely occurs if the provider was tailgating. As another example, if the trip lasted longer than the estimated travel time (e.g., by a threshold duration of time) for the trip, the rider will likely perceive the provider's service as low quality. The trip may have lasted longer than estimated because the provider is unfamiliar with the routes and directions in a particular city or section of a city. Examples of features that indicate high quality providers include driving without receiving any traffic law citations (e.g., for at least a threshold duration of time), driving without having any accidents, or receiving feedback representative of safe driving.

The features may also be related to interpersonal behavior, or in other words, how proficiently the provider interacts with riders while providing rides. For example, text feedback from a rider (e.g., "driver used profanity") showing unprofessional behavior of the provider indicates that the rider likely perceived the provider's service as low quality. The machine learning engine 230 can corroborate the veracity of the text feedback based on the telematics data for the same trip, e.g., audio data indicates that words of profanity were recorded during the trip. Examples of features that indicate high quality providers include receiving high ratings in feedback from riders or receiving text feedback including comments such as "driver helped me find my destination," or "I enjoyed my ride with the driver."

Features may be related to other factors aside from vehicle operation and interpersonal behavior. For example, text feedback from a rider (e.g., "could not understand driver's heavy accent") showing language difficulties with the provider indicates that the rider likely perceived the provider's service as low quality. As another example, the travel coordination system 100 may display a profile photo of a provider on the client device 110 of a rider when the provider is matched to the rider for a trip. Thus, the rider can use the profile photo to help identify the provider at the beginning of the trip, e.g., because the rider may not be previously acquainted with the provider. However, if the provider's profile photo is out of date (e.g., the provider has grown a beard or changed a hairstyle), the rider may not be able to recognize from the rider using the profile photo. Thus, feedback from the rider indicates that the rider thought that the wrong provider came to pick up the rider for the trip, which likely corresponds to a perception of low quality.

In one embodiment, the machine learning engine 230 identifies a first provider who has improved the quality of the first provider's services for a predetermined period of time (e.g., during the last month or X number of weeks) following the travel coordination system 100 providing an intervention of a first intervention type to the first provider. The machine learning engine 230 determines whether the first provider's quality improved based on features derived from rider feedback and/or telematics data from trips stored in the trip data store 235 (e.g., the first provider has not received negative feedback or a below average rating, the first provider has received a streak of 5-star ratings, motion data of the first provider's car shows that the car has not exceeded any speed limits, etc.). The machine learning engine 230 may also identify the first provider based on whether the first provider provided a threshold number of rides during the predetermined period of time (e.g., have provided at least twenty rides a week during the last month), for example, further based on information from the user data store 255. The machine learning engine 230 uses a set or sequence of some or all of the trips that led up to—or coincide with—the first provider's improvement in quality to form a first training set, e.g., a positive training set.

Further, the machine learning engine 230 identifies a second provider who has not improved the quality of the second provider's services for a predetermined period of time following the travel coordination system 100 providing an intervention of a second intervention type to the second provider. The machine learning engine 230 determines that the second provider's quality did not improve based on features derived from rider feedback and/or telematics data from trips stored in the trip data store 235. The machine learning engine 230 uses a set or sequence of some or all of the trips coinciding with the lack of improvement—or disimprovement—of the quality of service to form a second training set, e.g., a negative training set.

Additionally, the machine learning engine 230 identifies a third provider who has not improved the quality of the third provider's services for a predetermined period of time, where the travel coordination system 100 did not provide an intervention to the third provider. The machine learning engine 230 determines that the second provider's quality did not improve based on features derived from rider feedback and/or telematics data from trips stored in the trip data store 235. The machine learning engine 230 uses a set or sequence of some or all of the trips coinciding with the lack of improvement—or disimprovement—of the quality of service to form a third training set, e.g., a control training set.

Referring to the example positive, negative, and control training sets described in the embodiment above, a machine learning model trained using these three training sets can learn which intervention types lead to improvements provider quality. For example, the first, second, and third providers of the positive, negative, and control training sets, respectively, may each initially be associated with low quality service by the travel coordination system 100. The quality of the first provider improved after providing the first type of intervention, while the second provider's quality did not improve after providing the second type of intervention. Thus, based on the randomized experiment, the travel coordination system 100 determines that the first type of intervention is likely more effective at improving provider quality than the second type of intervention. Additionally, the third provider's quality also did not improve after no intervention was provided by the travel coordination system 100. Thus, the machine learning model trained using this feedback may predict that providing the first type of intervention is likely more effective than not providing any intervention at all (e.g., using the control scenario as a basis for comparison). The improvement in provider quality may correspond to a particular type of safety classification. For example, a provider with a high-risk safety classification of the type "vehicle operation" can improve by reducing the number of traffic citations received for a certain period of time. As another example, a provider with a high-risk safety classification of the type "poor attitude" can improve by receiving feedback from riders indicating that the provider acted professionally and respectfully during trips, or feedback indicating positive (e.g., 4-start or 5-star) ratings for categories such as "friendliness" and "service."

In some embodiments, the travel coordination system 100 performs many automated A/B tests similar to the example described above to determine which types of interventions result in increased provider quality when communicated to providers of the travel coordination system 100. The travel coordination system 100 may categorize the A/B tests based on various factors such as the demographic or geographical location information of the providers. In particular, certain types of interventions have a greater impact on providers in one country, while other types of interventions have a greater impact on providers in a different country. Additionally, the interventions may be customized based on safety risk classifications of the providers. For example, providers with high safety risk classification are more likely to fix their behavior (thus improving their quality) if the travel coordination system 100 displays stern warning messages to the providers. In contrast, providers with low safety risk classification are more likely to maintain high quality service if the travel coordination system 100 displays message of friendly trips to the providers.

In some embodiments, the travel coordination system 100 performs iterative AB tests using randomized controlled experiments. By running optimization experiments over time with a number of rides associated with different providers and riders, the machine learning model learns which particular features and intervention types are correlated with improved provider quality (e.g., and for particular types of safety classifications), and thus can design more targeted tests. Based on the results of the experiments, the travel coordination system 100 can also determine which experiments and interventions to scale up, e.g., to perform in a greater number of iterations with a larger population of providers and riders. In scaled experiments, the travel coordination system 100 can target a larger population of providers with a particular type of safety risk classification, and provide a certain intervention that has been found to be effective on other providers with the same (or similar) types of safety risk classifications. As another example, the machine learning model may learn that certain intervention types are more potent based on temporal features. For example, providers who provide rides in the afternoon rush hours are more receptive to improving their quality in response to receiving a message of a first intervention type, while providers who provide rides in the late night hours are more receptive to improving their quality in response to receiving a message of a second intervention type.

The intervention engine 240 provides an intervention to providers of the travel coordination system 100. The machine learning model selects an intervention from the intervention data store 250 based on a type of safety risk classification and/or an intervention type determined by the machine learning model trained by the machine learning engine 230. The intervention data store 250 stores a database of interventions that are each associated with one or more intervention types. Intervention types include, for example, accident/crash, altercation, phone handling, bad attitude, citation/police involvement, distracted driving, inappropriate behavior, passenger in car, poor or dangerous driving, or wrong driver, etc., which may correspond to a certain type of safety risk classification. The interventions may include messages that correspond to the type of intervention. For example, a message associated with a "passenger in car" intervention type, the message is "Non riders are not allowed in the car on a trip. If interested in driving, you can refer them, but cannot take trips with them" or "riders expect that you will not have personal friends or family with you on a trip. It can make riders feel uncomfortable." The messages and/or interventions may be provided by an administrator of the travel coordination system 100. Messages and/or interventions may be added or removed from the interventions data store 250 over time.

The intervention engine 240 can provide interventions that are proactive or reactive. For example, the intervention engine 240 provides a proactive intervention to reduce the likelihood that a provider will provide low quality service in future rides, e.g., by driving recklessly or arguing with riders. The intervention engine 240 provides a reactive intervention to in response to determining that a provider provided low quality service in one or more completed rides. The intervention engine 240 can provide proactive or reactive interventions before, during, or after a trip provided by a provider. For example, an intervention provided during a trip is displayed as a message on the client device 120 of the provider. The intervention may be in response to feedback provided by a rider of the trip to the travel coordination system 100 during the same trip. The intervention engine 240 may provide messages of positive reinforcement to providers who receive positive feedback, e.g., a rider comment such as "I felt safe riding with the driver!" or "Great conversation with the driver." Messages of positive reinforcement may reduce the likelihood that providers (e.g., associated with low safety risk classifications) will receive negative feedback during future trips. By providing interventions, the travel coordination system 100 may help improve overall rider perception of quality of its providers and reduce the number of safety incidents, thus providing a more satisfying user experience to riders.

III. Example Intervention Based on Feedback and Telematics Data

Figure 3:
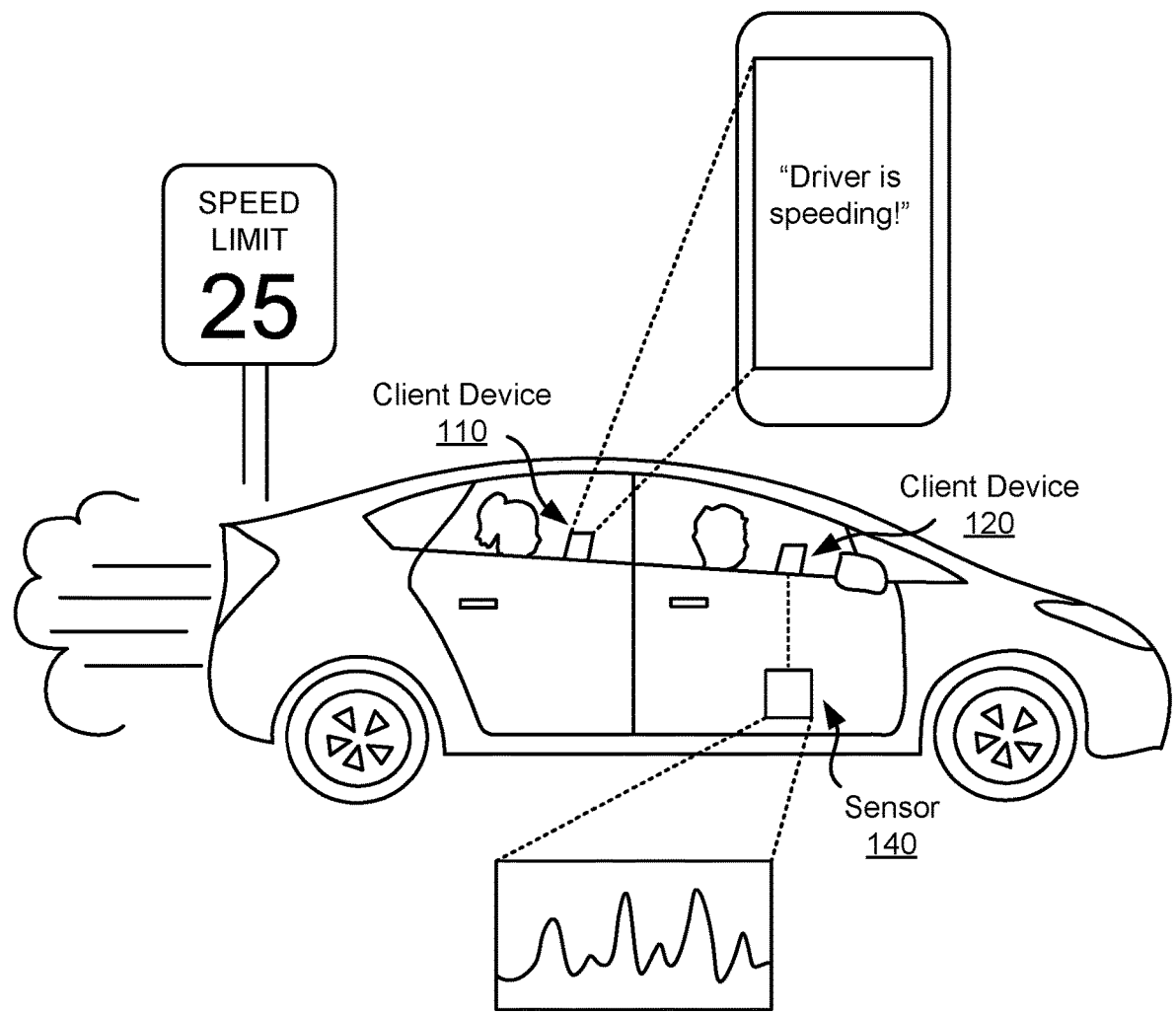
FIG. 3 illustrates feedback from a rider and telematics data collected during a trip of the travel coordination system according to one embodiment.

FIG. 3 illustrates feedback from a rider and telematics data collected during a trip of the travel coordination system 100 according to one embodiment. During the trip, the provider driving the car exceeds a speed limit of a road. For instance, the provider drove at an average speed of 64 kilometers per hour (approximately 40 miles per hour) for a duration of time on a road with a speed limit of 40 kilometers per hour (approximately 25 miles per hour). The rider input text feedback, "driver is speeding," using the client device 110. Additionally, the sensor 140, an accelerometer of the provider's client device 120 captures telematics data indicating the speed of the provider's car over time during the trip (including the duration of time when the provider was speeding). In addition to the accelerometer, a gyroscope sensor 140 of the client device 120 captures telematics data indicating that the provider's car was swerving from left to right repeatedly during the trip, as opposed to driving in an approximately straight line to follow lanes on the road (during straightaways). The rider feedback and the telematics data from both the accelerometer and gyroscope are provided to the travel coordination system 100.

Based on the rider feedback and telematics data as input, a machine learning model determines that a "poor driving" type of intervention should be provided to the provider. In particular, the feedback engine 220 determines that the rider feedback is related to vehicle operation, e.g., by using NLP to determining that the keyword "speeding" in the text is related to unsafe driving. Additionally, features such as exceeding the speed limit and repeatedly swerving while driving on straightaways indicate that the provider is not driving the car safely, which is consistent with the rider feedback. Thus, the model determines that the rider feedback has a high level of veracity. On the other hand, if the telematics data indicated that the speed of the provider's car did not ever exceed the speed limit, then the model determines that the rider feedback has a low level of veracity because the comment "driver is speeding" would be inconsistent with the telematics data. The model may determine intervention types based on the level of veracity of the rider feedback. For instance, if the level of veracity is greater than a threshold value, the model is likely to determine an intervention types related to the context of the rider feedback such as unsafe driving. Based on the input information, the model also determines that the provider has a high risk for a "vehicle operation" type of safety risk classification.

FIG. 4A is a diagram 400 of messages associated with unsafe driving according to one embodiment. In one example, interventions of type "poor driving" include the messages 410, 420, and 430. Message 410, "Create safe communities by obeying speed limits and traffic laws. Riders will appreciate your dedication to safety!" is a safety tip, or in other words, a piece of advice. The intervention engine 240 may provide safety tip messages to providers who have a low safety risk classification (e.g., of the "vehicle operation" type) as proactive reminders of characteristics of high quality service. Message 420, "We are receiving reports that your driving is unsafe. We're committed to safety and if these reports continue, and your account may be deactivated," is a warning. The intervention engine 240 may provide warning messages to providers who have a medium safety risk classification (e.g., of the "vehicle operation" type) in response to having another poor driving related incident. Message 430, "We have received multiple reports that your driving is unsafe. If these reports continue, your account will be deactivated," is a final warning. The intervention engine 240 may provide final warning messages to providers who have a high safety risk classification (e.g., of the "vehicle operation" type), or have previously been provided a related warning message. For instance, the intervention engine 240 escalates the warning message 420 to the final warning message 430. The travel coordination system 100 may remove a provider from the travel coordination system if the provider has another poor driving related incident after the intervention engine 240 provided a final warning message to the provider.

Following in the example described above in FIG. 3, the intervention engine 240 provides one of the messages 410, 420, or 430 to the provider because the machine learning model determines that a "poor driving" type of intervention should be provided to the provider associated with a high risk of the "vehicle operation" type of safety classification. In some embodiments, the intervention engine 240 selects a message that has not been provided to the provider before. For instance, if the safety tip of message 410 was previously displayed on the provider's client device 120, the intervention engine 240 may select a different safety tip such as "Traffic collisions are expensive and dangerous. Costly injuries can be avoided by being alert and obeying traffic laws," which is still relevant to the "poor driving" type of intervention. Since the intervention engine 240 may determine that the provider is not particularly responsive to the message 410, providing a different message may help influence the provider's behavior, and thus improve the provider's quality.

In one embodiment, the provider as described in FIG. 3 is associated with a medium safety risk classification by the travel coordination system 100. In response to the determination by the machine model that a "poor driving" type of intervention should be provided to the provider, the intervention engine 240 escalates a level of the safety risk classification of the provider from medium to high. The intervention engine 240 may change a level or a type of a provider's safety risk classification based on factors such as determining that the provider received negative feedback, e.g., "poor driving" or "bad attitude," or received a rating below a threshold value, e.g., a one star or two star rating on a scale from one to five stars, where five stars represents higher quality.

In addition to escalating a provider's safety risk classification, the intervention engine 240 may also de-escalate the provider's safety risk classification, e.g., if the travel coordination system 100 determines that the provider has improved the provider's quality of service for at least a threshold period of time. For instance, the intervention engine 240 de-escalates the provider's safety risk classification from medium to low if the provider does not receive any negative feedback during the last 20 trips provided by the provider, or during the last month.

FIG. 4B is a diagram 440 of messages associated with unsafe behavior according to one embodiment. Similar to the messages 410, 420, and 430 shown in FIG. 4A, the messages 450, 460, and 470 also represent a safety tip, a warning, and a final warning. However, the messages shown in FIG. 4B are related to the intervention type of "unsafe behavior" or "bad attitude" instead of "poor driving." Thus, the intervention engine 240 provides messages of the "bad attitude" intervention type to a provider in response to the machine learning model determining that the provider provides low quality service in regards to interpersonal behavior related incidents.

IV. Example Process Flows

FIG. 5 is a flowchart illustrating a process 500 for providing safety interventions using machine learning according to one embodiment. In some embodiments, the process 500 is used by the travel coordination system 100—e.g., modules of the travel coordination system 100 described with reference to FIG. 2—within the system environment in FIG. 1. The process 500 may include different or additional steps than those described in conjunction with FIG. 5 in some embodiments or perform steps in different orders than the order described in conjunction with FIG. 5.

In one embodiment, the feedback engine 220 receives 510 feedback data from a client device 110 of a user (e.g., a rider) of a travel coordination system 100 during a service (e.g., transportation for a trip) provided by a provider. The feedback data corresponds to a performance of the provider (e.g., of the travel coordination system 100) during the service. The telematics engine 210 receives 520 telematics data from one or more sensors 140. The sensor(s) 140 capture the telematics data during at least a portion of the service. The feedback engine 220 determines 530 a type of safety risk based at least in part on text included in the feedback data. The machine learning engine 230 uses 540 the telematics data and the type of safety risk as inputs to a machine learning model to determine an intervention type to address the performance of the provider. The intervention engine 240 provides 550 an intervention associated with the intervention type for display on a client device 120 of the provider.

In another embodiment, the feedback engine 220 receives feedback data from a client device 110 of a user of a travel coordination system 100 during a service provided by a provider. The feedback data describes a performance of the provider of the travel coordination system 100 during a trip provided by the provider to the user. The feedback engine 220 determines a type of the feedback based at least in part on text included in the feedback data. The machine learning engine 230 determines a safety risk classification of the provider from the user data store 255, e.g., based on one or more previously received feedback data associated with the provider. The machine learning engine 230 uses the type of the feedback and the safety risk classification as inputs to a machine learning model that determines an intervention type to address the performance of the provider. The intervention engine 240 provides an intervention associated with the intervention type for display on a client device 120 of the provider.

V. Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a request from a client device of a user of a network system, wherein the request is for a transportation service;
   determining a provider of the network system to provide the transportation service, wherein the provider operates a vehicle during the transportation service;
   receiving telematics data associated with the vehicle from one or more sensors that capture the telematics data during at least a portion of the transportation service;
   determining an intervention based on the telematics data; and
   providing the intervention for presentation on a client device of the provider, wherein the intervention is presented proactively to prevent a safety incident.

2. The method of claim 1, further comprising:
   determining that the provider is speeding beyond a speed limit based on telematics data, wherein the intervention indicates that the provider should obey the speed limit.

3. The method of claim 1, the method further comprising:
   determining that the vehicle is swerving based on the telematics data, wherein the telematics data is captured by one or more of an accelerometer, gyroscope, and GPS sensor.

4. The method of claim 1, wherein the client device of the user or the client device of the provider includes the one or more sensors.

5. The method of claim 1, wherein the one or more sensors are coupled to the vehicle.

6. The method of claim 1, wherein the intervention is a warning message, the method further comprising:
   deactivating an account of the provider on the network system responsive to determining that the provider has a safety incident while providing transportation service after the warning message is presented to the provider.

7. The method of claim 1, further comprising:
   providing the telematics data as input to a machine learning model to determine an intervention type of the intervention, wherein the machine learning model is trained at least using features derived from information associated with transportation services provided by providers to users of the network system.

8. The method of claim 1, further comprising:
   receiving feedback data from the client device of the user; and
   determining a level of veracity of the feedback data based on the telematics data, wherein the intervention is determined based on the level of veracity of the feedback data.

9. A non-transitory computer readable storage medium having instructions encoded thereon that, when executed by one or more processors, cause the one or more processors to:
   receive a request from a client device of a user of a network system, wherein the request is for a transportation service;
   determine a provider of the network system to provide the transportation service, wherein the provider operates a vehicle during the transportation service;
   receive telematics data associated with the vehicle from one or more sensors that capture the telematics data during at least a portion of the transportation service;
   determine an intervention based on the telematics data; and provide the intervention for presentation on a client device of the provider, wherein the intervention is presented proactively to prevent a safety incident.

10. The non-transitory computer readable storage medium of claim 9, having further instructions that when executed by the one or more processors cause the one or more processors to:
determine that the provider is speeding beyond a speed limit based on telematics data, wherein the intervention indicates that the provider should obey the speed limit.

11. The non-transitory computer readable storage medium of claim 9, having further instructions that when executed by the one or more processors cause the one or more processors to:
determine that the vehicle is swerving based on the telematics data, wherein the telematics data is captured by one or more of an accelerometer, gyroscope, and GPS sensor.

12. The non-transitory computer readable storage medium of claim 9, wherein the client device of the user or the client device of the provider includes the one or more sensors.

13. The non-transitory computer readable storage medium of claim 9, wherein the one or more sensors are coupled to the vehicle.

14. The non-transitory computer readable storage medium of claim 9, having further instructions that when executed by the one or more processors cause the one or more processors to:
deactivate an account of the provider on the network system responsive to determining that the provider has a safety incident while providing transportation service after a warning message is presented to the provider, wherein the intervention is the warning message.

15. The non-transitory computer readable storage medium of claim 9, having further instructions that when executed by the one or more processors cause the one or more processors to:
provide the telematics data as input to a machine learning model to determine an intervention type of the intervention, wherein the machine learning model is trained at least using features derived from information associated with transportation services provided by providers to users of the network system.

16. The non-transitory computer readable storage medium of claim 9, having further instructions that when executed by the one or more processors cause the one or more processors to:
receive feedback data from the client device of the user; and
determine a level of veracity of the feedback data based on the telematics data, wherein the intervention is determined based on the level of veracity of the feedback data.

17. A system comprising:
a plurality of client devices of a plurality of providers of a network system; and
a non-transitory computer readable storage medium having instructions encoded thereon that, when executed by one or more processors, cause the one or more processors to:
receive a request from a client device of a user of the network system, wherein the request is for a transportation service;
determine a provider of the plurality of providers of the network system to provide the transportation service, wherein the provider operates a vehicle during the transportation service;
receive telematics data associated with the vehicle from one or more sensors that capture the telematics data during at least a portion of the transportation service;
determine an intervention based on the telematics data; and
provide the intervention for presentation on a client device of the provider, wherein the intervention is presented proactively to prevent a safety incident.

18. The system of claim 17, wherein the non-transitory computer readable storage medium includes further instructions that when executed by the one or more processors cause the one or more processors to:
determine that the provider is speeding beyond a speed limit based on telematics data, wherein the intervention indicates that the provider should obey the speed limit.

19. The system of claim 17, wherein the non-transitory computer readable storage medium includes further instructions that when executed by the one or more processors cause the one or more processors to:
determine that the vehicle is swerving based on the telematics data, wherein the telematics data is captured by one or more of an accelerometer, gyroscope, and GPS sensor.

20. The system of claim 17, wherein the non-transitory computer readable storage medium includes further instructions that when executed by the one or more processors cause the one or more processors to:
deactivate an account of the provider on the network system responsive to determining that the provider has a safety incident while providing transportation service after a warning message is presented to the provider, wherein the intervention is the warning message.

* * * * *